United States Patent
Skog et al.

(10) Patent No.: US 8,209,432 B2
(45) Date of Patent: Jun. 26, 2012

(54) METHOD AND ARRANGEMENT FOR COMMUNICATING MULTIMEDIA CONTENT

(75) Inventors: Robert Skog, Hässelby (SE); Joakim Movander, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 640 days.

(21) Appl. No.: 11/908,752

(22) PCT Filed: Jun. 28, 2005

(86) PCT No.: PCT/SE2005/001020
§ 371 (c)(1),
(2), (4) Date: Sep. 14, 2007

(87) PCT Pub. No.: WO2006/098670
PCT Pub. Date: Sep. 21, 2006

(65) Prior Publication Data
US 2008/0114850 A1 May 15, 2008

(30) Foreign Application Priority Data

Mar. 14, 2005 (SE) ........................................ 0500593
Mar. 14, 2005 (SE) ........................................ 0500594

(51) Int. Cl.
*G06F 15/16* (2006.01)
(52) U.S. Cl. ...................... 709/234; 709/206; 455/412.1; 455/466
(58) Field of Classification Search ................... 709/234, 709/206, 207, 230, 232; 455/466, 412.1, 455/412.2, 413
See application file for complete search history.

(56) References Cited

U.S. PATENT DOCUMENTS

| | | | |
|---|---|---|---|
| 2003/0095540 A1* | 5/2003 | Mulligan et al. | 370/352 |
| 2003/0172121 A1* | 9/2003 | Evans et al. | 709/206 |
| 2004/0266411 A1* | 12/2004 | Galicia et al. | 455/414.4 |
| 2005/0064883 A1* | 3/2005 | Heck et al. | 455/466 |

* cited by examiner

*Primary Examiner* — Wing Chan
*Assistant Examiner* — Ruolei Zong

(57) ABSTRACT

A method and arrangement for conveying selected media content from a sending entity (A) to a receiving terminal (B) when the sending entity sends the media content for immediate delivery over IP. A session manager detects that the receiving terminal is unable to receive the selected multimedia content by immediate delivery over IP. A format converter (308,608) converts the media content into a format adapted for deferred delivery involving temporary storage of the media content in an intermediate messaging center (310,610), and sends the converted media content to the messaging center for deferred delivery to the receiving terminal. The session manager and the format converter are both implemented in an originating multimedia service network (300,600) serving the sending entity, or in a terminating multimedia service network (302,602) serving the receiving terminal.

26 Claims, 5 Drawing Sheets

METHOD AND ARRANGEMENT FOR COMMUNICATING MULTIMEDIA CONTENT

TECHNICAL FIELD

The present invention relates generally to a method and apparatus for conveying multimedia content, such as visual content, to a receiving terminal. In particular, the invention enables transfer of the content even when the receiving terminal is incompatible in a first transmission attempt over an IP multimedia network.

BACKGROUND OF THE INVENTION AND PRIOR ART

Until recently, wireless mobile terminals have been used basically for making voice calls. Standardised and well-established communication technologies and protocols are then utilised to communicate voice between fixed and/or mobile terminals using circuit-switched communication channels.

However, a multitude of new telephony services involving "multimedia" are now rapidly being developed, enabled by the introduction of new technologies allowing for notably higher transmission rates and increased network capacity. For example, GPRS (General Packet Radio Service) and WCDMA (Wideband Code Division Multiple Access) technologies are currently emerging for enabling wireless telephony services requiring a wide range of transmission rates and different protocols and media formats.

The trend today is also a move towards packet-switched networks and technologies providing more capacity and flexibility as compared to the traditional circuit-switched networks. Further, new sophisticated mobile terminals are also emerging on the market, equipped with functionality to handle the new services, including high resolution colour displays and various codecs (coders/decoders) e.g. for visual information.

Multimedia services typically involve transmission of encoded data representing text, documents, images, audio files and video files in a multitude of formats and combinations. The term "multimedia" will be used in this description as generally referring to any choice of media types, apart from ordinary voice dialogues and typically with some visual content, which is communicated by using the packet based IP (Internet Protocol) transport technology. Further, the term "media content" will be used to represent any such encoded data transferred when exercising multimedia services.

A network architecture called "IP Multimedia Subsystem" (IMS) has been developed by the 3$^{rd}$ Generation Partnership Project (3GPP) as an open standard, to give operators of access networks the ability to offer multimedia services in the packet domain. IMS is a platform for enabling services based on IP transport, involving immediate delivery of media content from one terminal to another, sometimes referred to as "instant messaging". IMS is more or less independent of the access technology used, and is basically not restricted to any limited set of specific services.

A specification for handling sessions in IMS networks has been defined called "SIP" (Session Initiation Protocol, according to the standard IETF RFC 3261 et al). SIP is an application-layer control (signalling) protocol for creating, modifying and terminating sessions over a packet-switched logic. For example, a message called "INVITE" is defined in SIP to initiate a session during session set-up, when the terminals basically agree on which session parameters and codecs to use for the transfer of media content. The SIP standard is thus used by IMS systems to establish and control IP multimedia communications.

FIG. 1 illustrates schematically a basic network structure for providing multimedia services by means of an IMS service network. It should be noted that the figure is greatly simplified and only shows a selection of network nodes helpful to understand the context of the present invention. A calling mobile terminal A is connected to a first radio access network 100 and communicates with a called mobile terminal B connected to a second radio access network 102, in a communication session S involving one or more multimedia services. Alternatively, terminal A may communicate with a fixed terminal or computer or a content server delivering some multimedia content to the terminal, such as music, films, images or games.

An IMS network 104 is connected to the first radio access network 100 and handles the session with respect to terminal A, as initiated by its user. In fact, the IMS network 104 receives and processes any service requests or data from the user of terminal A. In this figure, a corresponding IMS network 106 handles the session on behalf of terminal B, and the two IMS networks 104 and 106 may be controlled by different operators. Similarly, the IMS network 106 receives and processes any service requests or data from the user of terminal B. Alternatively, terminals A and B may of course be connected to the same access network and/or belong to the same IMS network.

The illustrated session S is generally managed, using SIP signalling, by a node called S-CSCF (Serving Call Session Control Function) 108 assigned to terminal A in the IMS network 104, and the selected multimedia service is enabled and executed by an application server 110. Basically, the S-CSCF node 108 serves as a proxy for the application server 110 towards terminal, A and sends SIP messages from terminal A to the IMS network 106 of terminal B, as indicated by a dashed arrow towards block 106. Further, a main database element HSS (Home Subscriber Server) 112 stores subscriber and authentication data as well as service information, among other things, that the application server 110 can fetch for executing services for clients. The S-CSCF node 108 may also fetch information from the HSS 112 to determine which application server 110 to handle a service requested by terminal A, as determined by "triggers" in the HSS 112.

A node called I-CSCF (Interrogating Call Session Control Function) 114 is connected to other IMS networks, including network 106, and acts as a gateway for SIP messages from the other IMS networks. Thus, I-CSCF node 114 receives SIP messages from the IMS network 106 of terminal B, as indicated by another dashed arrow towards block 114. Another node called P-CSCF (Proxy Call Session Control Function) 116 acts as an entry point towards the IMS network 104 from any access network, such as network 100, and all signalling flows between clients and the IMS network 104 are routed through the P-CSCF 116.

Of course, the IMS network 104 contains numerous other nodes and functions, such as further S-CSCF nodes and application servers, which are not shown here for the sake of simplicity. Basically, the IMS network 106 comprises the same type of nodes as network 104. The shown application server 110 may be configured to provide one or more specific multimedia services to clients. The various specific functions of the S-CSCF, I-CSCF, P-CSCF nodes 108, 114, 116, and the application server 110 are not necessary to describe here further to understand the context of the present invention. Any of these network elements will generically be referred to as a "session manager" in the following description.

In this description, distinction is made between the term "immediate delivery", referring to direct transfer of media content point-to-point from a sending terminal to a receiving terminal, and the term "deferred delivery" meaning that the sent media content is temporarily stored in an intermediate messaging service node, here generally called "messaging center", for a period of time before it is finally delivered to the receiver. This method is sometimes also referred to as "store-and-forward" and is used in the well-known MMS (Multimedia Messaging Service) concept where the sent multimedia content is processed and stored in an MMS service node in the service network before delivery to the receiver. The processing of content data in MMS service nodes typically involves adaptation of the data to the capabilities of the receiving terminal by using well-established formats. In IMS networks, immediate delivery is practiced without any storage of communicated content in an intermediate messaging center.

However, IP multimedia communication will sometimes fail due to the inability of a terminal to receive content from another terminal. For example, the receiving terminal may not be currently registered with a multimedia service network. In another case, even when being registered, the terminal may not be capable of handling a specific required data format when lacking the necessary codec, or may not be able to receive data files that are too large due to lack of storage space, or may not support an application used by the other terminal, etc. In yet another case, the receiving terminal may simply not be available for communication, such as when powered off or out of radio coverage. It may also currently be connected to an access network that cannot submit communicated content to the terminal, e.g. due to a current lack of bandwidth or the network's incapability of handling circuit-switched and packet-switched communication simultaneously during an ongoing call.

A terminal unable to receive multimedia content for whatever reason, e.g. as exemplified above, will hereafter be referred to as "incompatible" for short. A "mainstream technology" has been developed allowing the terminating access network to convert the format of transmitted content into another format that the receiving terminal can handle, in the case of incompatibility. However, in the rapidly developing IP multimedia technology it is difficult for access networks to be up-to-date with the latest plethora of terminal capabilities for IP multimedia content, particularly visual content. It might also be possible for the sending terminal to convert the content "on the fly" into other formats that the receiving terminal hopefully can accept, and then try to send it again. However, this is a difficult task and far from all terminals have that capability.

If a first terminal generally tries to send IP multimedia content to an incompatible second terminal, e.g. by first sending an INVITE message according to the SIP standard, the second terminal will respond by sending some kind of error message, or not respond at all. In that case, the desired content cannot be conveyed to the incompatible second terminal and the first terminal will receive an error message from its service network. This situation will of course be perceived negatively by the terminal users, not being able to exchange multimedia content, as well as by network operators concerned being deprived of potential revenue.

Applicant's own European Patent Application EP 04445130.0 describes a solution where a sending entity checks the compatibility of a receiving terminal with respect to selected multimedia content to be transferred. If immediate delivery of the multimedia content is not possible due to incompatibility of the receiving terminal, the sending entity instead sends an MMS (message by deferred delivery including the selected content. However, this solution requires that specific functionality for converting the content into an MMS message is present in the sending entity.

Hence, it is desirable to overcome the problem of conveying IP multimedia content to incompatible terminals, without relying on the existing mainstream technology in access networks or on format conversion capabilities in terminals.

SUMMARY OF THE INVENTION

It is an object of the present invention to provide a solution for communicating multimedia content from a sending entity to a receiving terminal, even if the receiving terminal is currently not registered with an IP multimedia service network, or is generally unable to receive the multimedia content by immediate delivery for whatever reason. It is another object of the present invention to enable the transfer of multimedia content to an incompatible second terminal, without requiring any functionalities or modifications in the sending entity to that end.

These objects and others are obtained by providing a method and arrangement for conveying selected media content from a sending entity to a receiving terminal when the sending entity sends the media content for immediate delivery over IP. The inventive method is to be executed in an originating multimedia service network serving the sending entity, or in a terminating multimedia service network serving the receiving terminal. It is first detected that the receiving terminal is unable to receive said media content by immediate delivery over IP. Then, the media content is converted in a format converter into a format adapted for deferred delivery, and the converted media content is sent to an intermediate messaging center for deferred delivery to the receiving terminal. The media content is preferably sent as an MMS message to the messaging center.

A session initiating message directed to the receiving terminal may first be received from the sending entity, said message being intended to initiate a session for immediate delivery over IP of the selected media content. If the session initiating message is to be followed by the transfer of the media content from the sending entity, an acknowledging message is sent to the sending entity in response to the session initiating message, giving an address of the format converter as the receiving address for said media transfer, such that the sending entity transfers the media content to the format converter. Alternatively, if the session initiating message contains the actual media content, the session initiating message containing the media content is transferred to the format converter for said format conversion.

When the method is performed in the originating network, it may be detected that the receiving terminal is unable to receive the media content by immediate delivery over IP, when a session manager in the originating network receives an error message from a session manager in the terminating network, in response to said session initiating message. The session manager in the originating network may then rewrite this error message by changing it into the acknowledging message before sending it to the sending entity.

When the method is performed in the terminating network, it may be detected that the receiving terminal is unable to receive the media content by immediate delivery over IP, when a session manager in the terminating network determines that the receiving terminal is incompatible.

The present inventive method can be used when the originating and terminating networks are IMS networks using SIP signalling for session management. If the session initiating message is to be followed by the transfer of the media content from the sending entity, the session initiating message may be "SIP INVITE" to be followed by the transfer of the media content. On the other hand, if the session initiating message contains the actual media content, the session initiating message may be "SIP MESSAGE" containing the actual media content.

The inventive arrangement includes a session manager having means for detecting that the receiving terminal is unable to receive the media content by immediate delivery over IP. The arrangement further includes a format converter having means for converting the media content into a format adapted for deferred delivery, and means for sending the converted media content to an intermediate messaging center for deferred delivery to the receiving terminal. The session manager and format converter can be implemented in an originating multimedia service network serving the sending entity, or in a terminating multimedia service network serving the receiving terminal. Preferably, the format converter further includes means for sending the media content as an MMS message to the messaging center.

The session manager may further include means for receiving a session initiating message from the sending entity, directed to the receiving terminal and intended to initiate a session for immediate delivery over IP of the selected media content. If the session initiating message is to be followed by the transfer of the media content from the sending entity, the session manager preferably further includes means for sending an acknowledging message to the sending entity in response to the session initiating message, giving an address of the format converter as the receiving address for the media transfer, such that the sending entity transfers the media content to the format converter. However, if the session initiating message contains the actual media content, the session manager preferably further includes means for transferring the session initiating message containing the media content to the format converter for the format conversion.

When the session manager and format converter are implemented in the originating network, the session manager further includes means for detecting said inability of the receiving terminal by receiving an error message from a session manager in the terminating network, in response to said session initiating message. In that case, the session manager in the originating network preferably further includes means for rewriting the error message by changing it into the acknowledging message before sending it to the sending entity.

When the session manager and format converter are implemented in the terminating network, the session manager preferably further includes means for detecting said inability of the receiving terminal by determining that the receiving terminal is incompatible.

If the session initiating message is to be followed by the transfer of the media content from the sending entity, the session initiating message may be "SIP INVITE" to be followed by the transfer of the media content. On the other hand, if the session initiating message contains the actual media content, the session initiating message may be "SIP MESSAGE" containing the actual media content.

The present invention further encompasses a session manager, in an arrangement for conveying selected media content from a sending entity to a receiving terminal when the sending entity sends the media content for immediate delivery over IP. The inventive session manager includes means for detecting that the receiving terminal is unable to receive said media content by immediate delivery over IP. The session manager further includes means for ensuring that the media content is transferred to a format converter for conversion into a format adapted for deferred delivery, such that the converted media content can be sent to an intermediate messaging center for deferred delivery to the receiving terminal.

The session manager preferably further includes means for receiving a session initiating message from the sending entity, directed to the receiving terminal and intended to initiate a session for immediate delivery over IP of the selected media content. If the session initiating message is to be followed by the transfer of the media content from the sending entity, the session manager may further include means for sending an acknowledging message to the sending entity in response to the session initiating message, giving an address of the format converter as the receiving address for said media transfer, such that the sending entity transfers the media content to the format converter. If the session initiating message contains the actual media content, the session manager may further include means for transferring said session initiating message containing the media content to the format converter for the format conversion.

When the session manager is implemented in the originating network, it may further include means for detecting said inability of the receiving terminal by receiving an error message from a session manager in the terminating network, in response to said session initiating message. The session manager may then further include means for rewriting the error message by changing it into the acknowledging message before sending it to the sending entity. When the session manager is implemented in the terminating network, it may further include means for detecting said inability of the receiving terminal by determining that the receiving terminal is incompatible.

The originating and terminating networks are preferably IMS networks using SIP signalling for session management. If the session initiating message is to be followed by the transfer of the media content from the sending entity, the session initiating message may be "SIP INVITE" to be followed by the transfer of the media content. On the other hand, if the session initiating message contains the actual media content, the session initiating message may be "SIP MESSAGE" containing the actual media content.

The present invention further encompasses a format converter, in an arrangement for conveying selected media content from a sending entity (A) to a receiving terminal (B) when the sending entity sends the media content for immediate delivery over IP. The format converter includes means for receiving the media content when it is detected that the receiving terminal is unable to receive said media content by immediate delivery over IP. The format converter further includes means for converting the media content into a format adapted for deferred delivery, and means for sending the converted media content to an intermediate messaging center for deferred delivery to the receiving terminal. The format converter preferably further includes means for sending the media content as an MMS message to the messaging center.

Further features and benefits of the present invention will be apparent from the detailed description below.

BRIEF DESCRIPTION OF THE DRAWINGS

The present invention will now be described in more detail by means of preferred embodiments and with reference to the accompanying drawings, in which.

DESCRIPTION OF PREFERRED EMBODIMENTS

In all the following described aspects and embodiments of the present invention, a sending terminal A generally attempts to communicate media content by immediate delivery to a receiving terminal B. The present invention can be implemented in a communication service network of either the sending terminal A or the receiving terminal B, according to different embodiments. Typically, the communication service network of either terminal is an IMS network using SIP for handling sessions, although the present invention is generally not limited in this respect.

Figure 1:
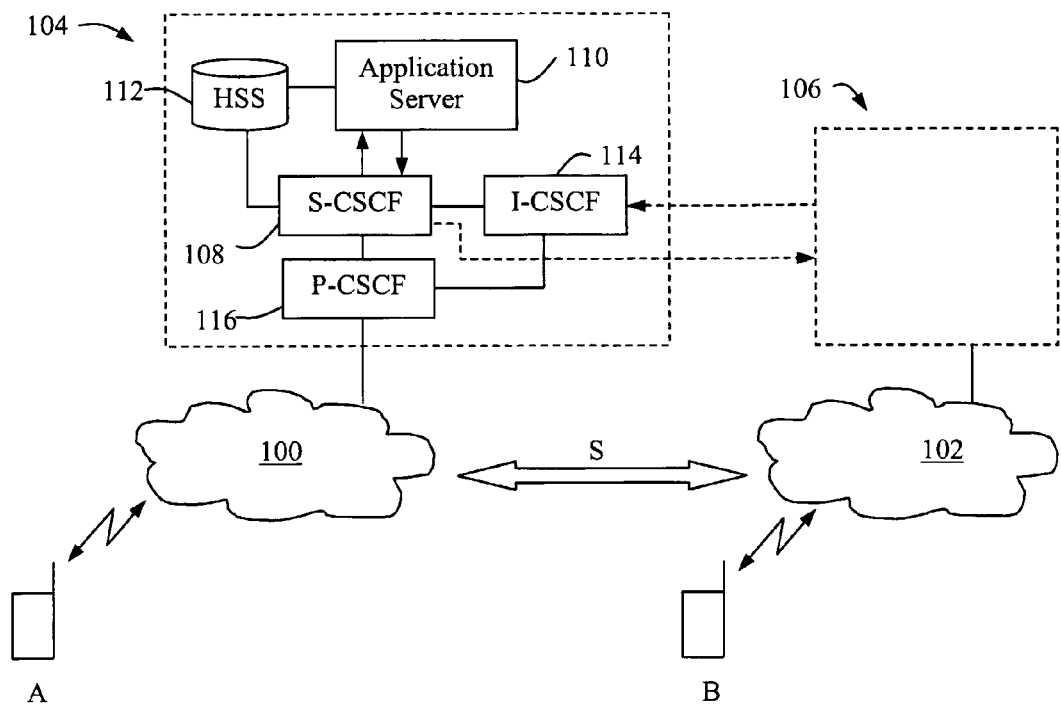
FIG. 1 is a schematic view of a conventional network structure for communicating multimedia content.
Figure 2:
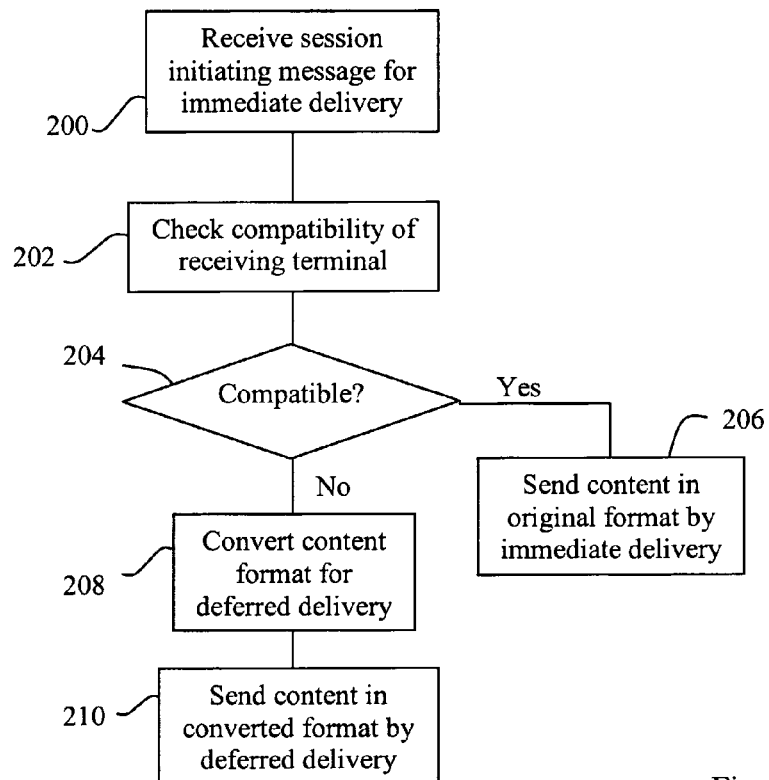
FIG. 2 is a flow chart of a basic procedure for communicating multimedia content, in accordance with the present invention.

FIG. 2 is a flow chart showing a procedure for communicating multimedia content from a sending entity to a receiving terminal that is found to be "incompatible", i.e. not available for reception by immediate delivery over IP, in the sense described in the background section above. The shown procedure is intended to be executed by one or more suitable network elements, which will be explained in more detail below with reference to further figures. In a first step 200, a session initiating message is generally received which is a message for initiating a session for immediate delivery of media content, such as "SIP INVITE" or "SIP MESSAGE" if SIP is used. The session initiating message thus indicates that the sending entity attempts to send some selected media content over IP.

The compatibility of the receiving terminal is then checked in a step 202 which is indicated in a response, or lack of response, to the session initiating message, to be described in more detail below. After a determining step 204, if the terminal is compatible, the media content can be delivered in its originally sent format by immediate delivery as intended by the sending entity, which is illustrated by a step 206. However, if the terminal is found to be incompatible in determining step 204, the media content is converted into a format adapted for deferred delivery from an intermediate messaging center, in a step 208, and is then sent by deferred delivery from the messaging center in a final step 210.

While in step 204 the receiving terminal was found to be unable to receive the media content by immediate delivery as originally intended, it will most likely be able to receive the media content by deferred delivery, since most terminals are adapted to this form of media delivery at any suitable point of time. Most typically, deferred delivery is accomplished by means of the well-established MMS technique that most terminals of today can cope with, although the present invention is generally not limited thereto. The success of delivery also lies in the fact that the messaging center stores the media content for a period of time such that the receiving terminal can fetch it therefrom at any suitable point. For example, if the terminal was powered off when the message was sent, it can fetch the content from the messaging center later when being powered-on and properly connected.

Figure 3:
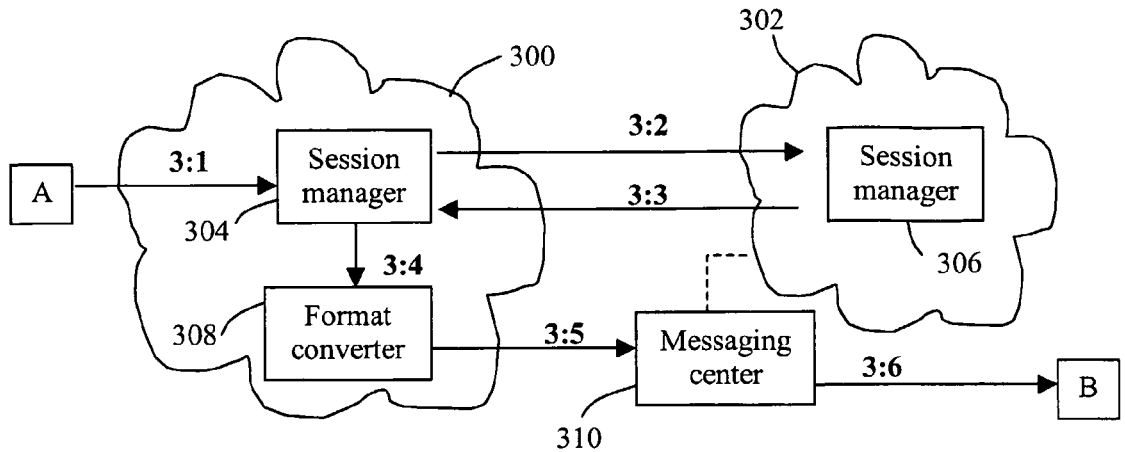
FIG. 3 is a schematic block diagram of an arrangement for communicating multimedia content, according to one embodiment.

In FIG. 3, an arrangement for communicating media content to an incompatible terminal according to one preferred embodiment, is illustrated. The sending entity A is connected to an originating multimedia service network 300, and the receiving terminal B belongs to a terminating multimedia network 302. For whatever reason, terminal B is currently not registered with network 302 and can therefore not receive any media content by immediate delivery at the moment. Each network 300, 302 includes a session manager 304 and 306, respectively, for handling multimedia sessions over IP. Further, originating network 300 includes a format converter 308, and a messaging center 310 is connected to terminating network 302.

In this embodiment, the present solution is basically implemented in session manager 304 and format converter 308 of the originating network 300. It should be noted that the generically named session manager 304 may be an S-CSCF node, an I-CSCF node, a P-CSCF node, or an application server, as described above in the context of IMS, depending on the implementation in network 300.

Although shown here as a separate unit, the format converter 308 may also be implemented as a function in session manager 304. The messaging center 310 is typically integrated in terminating network 302.

When entity A sends a session initiating message for immediate delivery of media content in a step 3:1, session manager 304 basically checks with session manager 306 if immediate media delivery over IP is possible in a step 3:2. Next, since terminal B is incompatible, session manager 306 basically responds to session manager 304 that immediate media delivery is not possible in a step 3:3 by means of a suitable error message. Then, session manager 304 forwards the media content to format converter 308, in a step 3:4, which adapts the content for deferred delivery, using any suitable conversion scheme(s). The converted media content is then sent to messaging center 310 in a next step 3:5 for deferred delivery therefrom in a final step 3:6, whenever possible with respect to the availability of terminal B.

Figure 4:
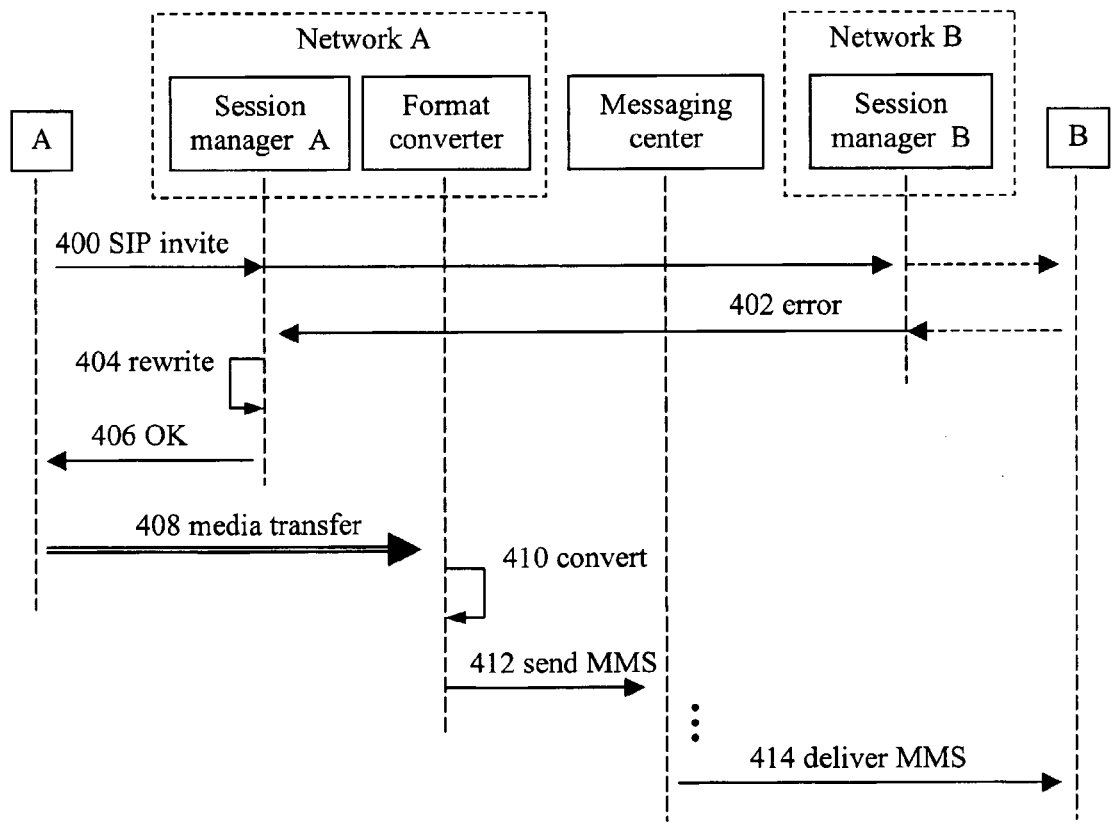
FIG. 4 is a signalling diagram illustrating a procedure for communicating multimedia content using the arrangement shown in FIG. 3, according to another embodiment.
Figure 5:
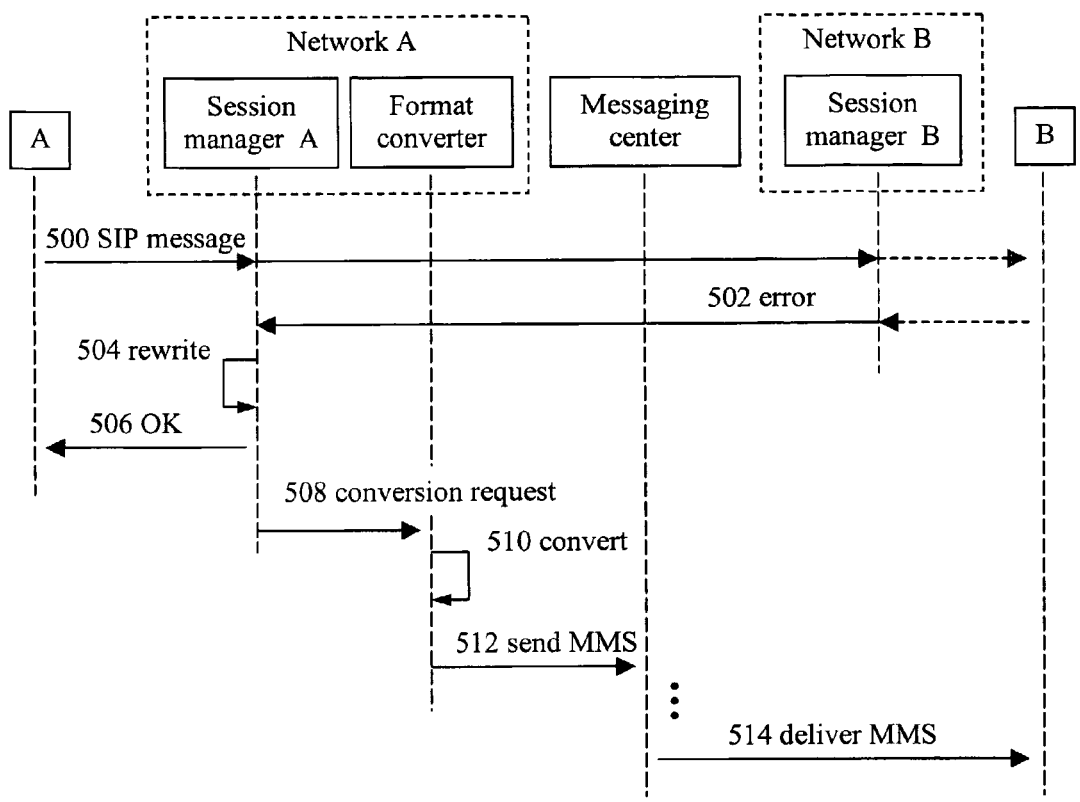
FIG. 5 is a signalling diagram illustrating a procedure for communicating multimedia content using the arrangement shown in FIG. 3, according to yet another embodiment.

With reference to FIGS. 4 and 5, respectively, two exemplary signalling procedures will now be described for how the present invention can be implemented using the arrangement shown in FIG. 3. In these examples, SIP signalling is used, although the present invention is basically not limited thereto.

In FIG. 4, entity A sends an "SIP INVITE" message, in a first step 400, to initiate a packet-switched session with terminal B for immediate delivery over IP of some selected media content. The SIP INVITE message typically includes information on the media to be transmitted, such as required codec(s) and file size. This message is conveyed over session manager A of network A to session manager B of network B. Since terminal B is incompatible for whatever reason, session manager B responds by sending a suitable error message in a step 402, such as "SIP 500 ERROR", according to conventional procedures. For example, session manager B may have detected that terminal B is not registered with network B, or if the SIP INVITE was sent to the terminal, it may have responded with an error message or it may not have responded at all.

When receiving the error message, session manager A rewrites this message in a step 404 by changing it to an acknowledgement message, such as "SIP 200 OK", further adding the address of the format converter 308 as the destination address for the media content to be sent. Then, this message is sent to entity A in a following step 406. Entity A then accordingly sends the selected media content to format converter 308, as indicated by a step 408.

The format converter then prepares the received media content for deferred delivery by suitable conversion, in a conversion step 410, preferably using the MMS technique as in the shown example. The format converter then sends the converted media content to the messaging center 310, in a step 412, where it is stored temporarily. The converted media content can then be finally delivered to terminal B in a step 414, which may be done in any suitable conventional way.

In FIG. 5, an alternative signalling procedure is shown, again using the arrangement shown in FIG. 3. In this example, the entity A initially sends a session initiating message that actually contains the media content to be delivered to terminal B. Thus, no more messages containing further media content will follow from entity A. As SIP is used in this example, a message called "SIP MESSAGE" containing the media content is sent towards terminal B, in a first step 500, which is conveyed over session manager A to session manager B. For example, if the media content consists of a simple text string, it can readily be accommodated in the SIP MESSAGE.

As terminal B is incompatible, session manager B again responds by sending a suitable error message in a step 502, such as "SIP 500 ERROR", according to conventional procedures. When receiving the error message, session manager A may rewrite this message in a step 504 by changing it to an acknowledgement message, such as "SIP 200 OK", and then send it to entity A in a following step 506, to verify that the media content will be delivered. However, steps 504 and 506 may alternatively be omitted and a new message, not shown, may be sent to entity A specifically indicating that the content could not be delivered immediately over IP as intended, and that it will be sent by deferred delivery using a messaging center instead.

In any case, session manger A now sends a conversion request for the received media content to the format converter 308, in a step 508. The format converter then converts the received media content for deferred delivery, in a conversion step 510. In a next step 512, the format converter sends the converted media content, here in an MMS format, to the messaging center 310 where it is stored temporarily. The converted media content can then be finally delivered to terminal B in a step 514, as in the previous example.

Figure 6:
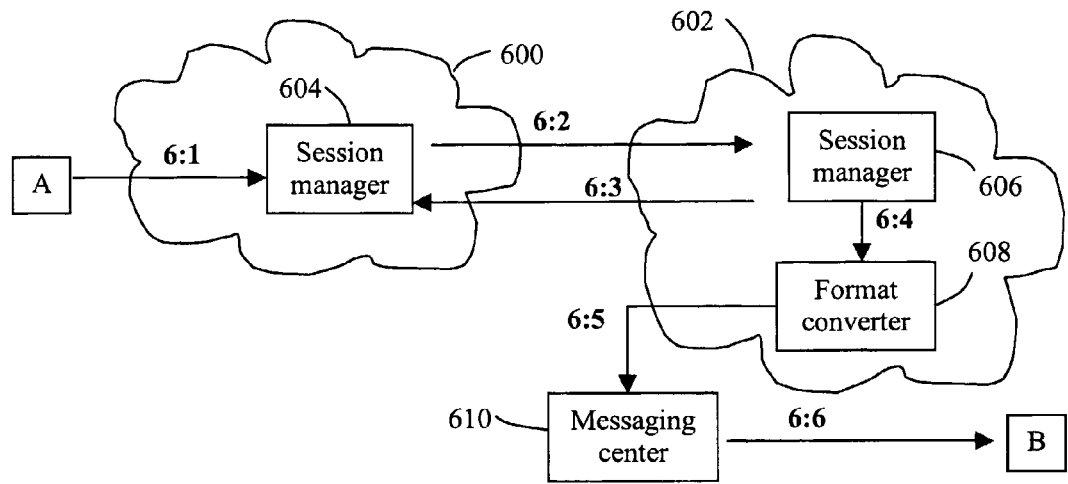
FIG. 6 is a schematic block diagram of an arrangement for communicating multimedia content, according to yet another embodiment.

FIG. 6 illustrates an arrangement for communicating multimedia content to an incompatible terminal, according to another preferred embodiment. As in the embodiment of FIG. 3, entity A is connected to an originating network 600 and terminal B belongs to a terminating network 602. Each network 600, 602 includes a session manager 604 and 606, respectively, for handling multimedia sessions. However, a format converter 308 is here included in the terminating network 602, instead of in the originating network A as in the previous examples. A messaging center 610 is likewise connected to terminating network 602.

In this embodiment, the present solution is basically implemented in session manager 606 and format converter 608 of the terminating network 602. Again, the session manager 606 may be an S-CSCF node, an I-CSCF node, a P-CSCF node, or an application server, depending on the implementation in network 602. Although shown here as a separate unit, the format converter 608 may also be implemented as a function in session manager 606. The messaging center 610 is typically integrated in terminating network 602.

When entity A sends a session initiating message for immediate delivery of media content over IP in a step 6:1, session manager 604 basically forwards the message to session manager 606 in a step 6:2, which checks if immediate media delivery is possible. Even though terminal B is incompatible, session manager 306 may then respond that immediate media delivery is possible in a step 6:3 by means of an acknowledging message. Then, session manager 606 forwards the media content to format converter 608, in a step 6:4, which adapts the content for deferred delivery, using any suitable conversion scheme(s). The converted media content is then sent to messaging center 610 in a next step 6:5 for deferred delivery therefrom in a final step 6:6.

Figure 7:
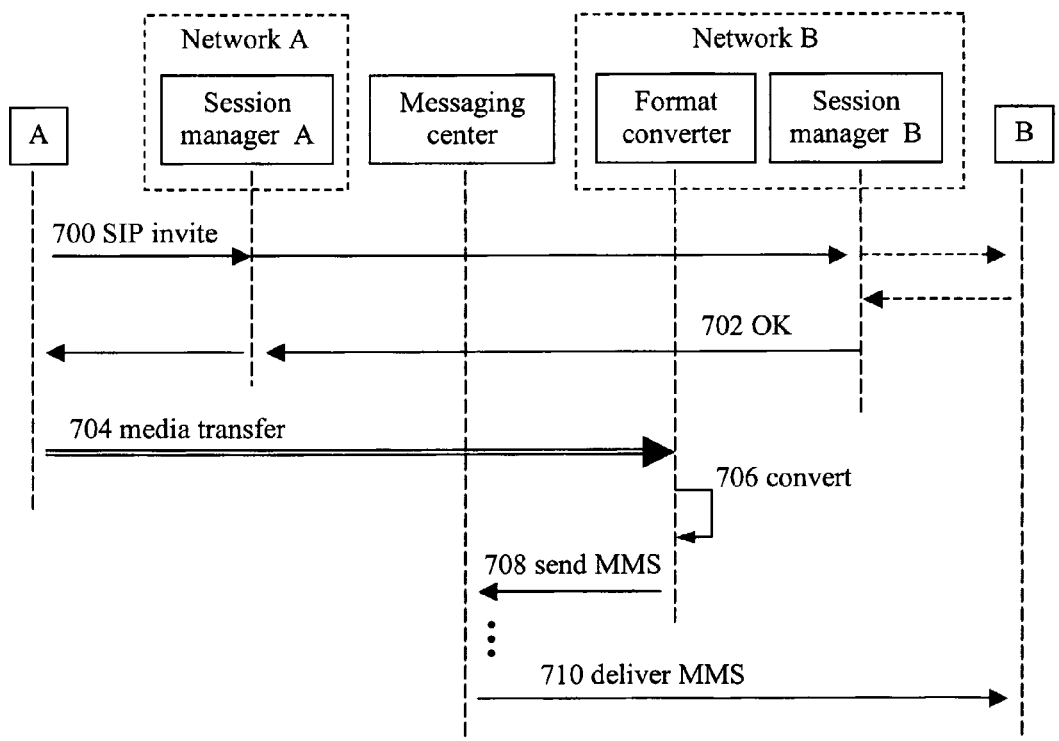
FIG. 7 is a signalling diagram illustrating a procedure for communicating multimedia content using the arrangement shown in FIG. 6, according to yet another embodiment.
Figure 8:
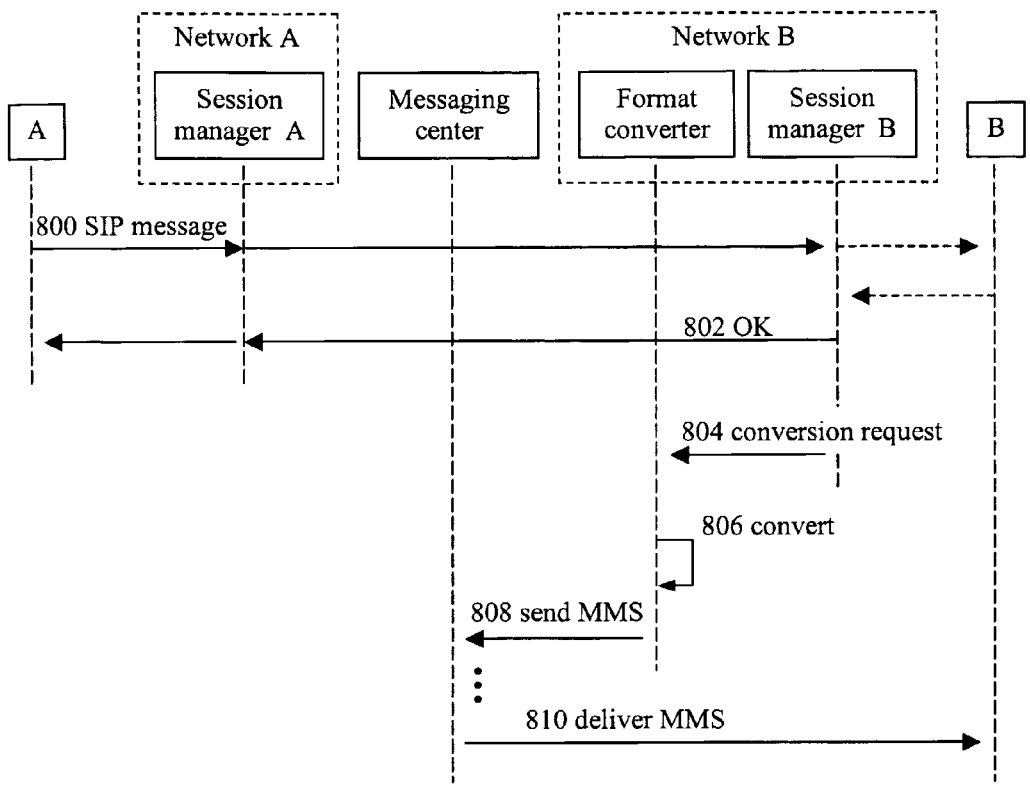
FIG. 8 is a signalling diagram illustrating a procedure for communicating multimedia content using the arrangement shown in FIG. 6, according to yet another embodiment.

With reference to FIGS. 7 and 8, respectively, two exemplary signalling procedures will now be described for how the present invention can be implemented using the arrangement shown in FIG. 6. In these examples, SIP signalling is again used, although the present invention is basically not limited thereto.

In FIG. 7, entity A sends an "SIP INVITE" message, in a first step 700, to initiate a packet-switched session with terminal B for immediate delivery over IP of some selected media content. This message is conveyed over session manager A to session manager B, as similar to the example of FIG. 4. Even though terminal B is again found to be incompatible, session manager B now responds by actually sending an acknowledging message in a step 702, such as "SIP 200 OK", also giving the address of the format converter 608 as the destination address for the media content to be sent. This message is conveyed over session manager A to entity A, as shown. Entity A then accordingly sends the media content to format converter 608, as indicated by a step 704.

The remaining steps basically correspond to steps 410-414 in the embodiment of FIG. 4. Thus, the format converter converts the received media content, in a conversion step 706, for deferred delivery of the content, here using the MMS format. The format converter then sends the converted media content as an MMS to the messaging center 610, in a step 708, where it is stored temporarily. The converted media content can then finally be delivered to terminal B in a step 710.

In FIG. 8, an alternative signalling procedure is shown, again using the arrangement shown in FIG. 6. In this example, entity A initially sends a session initiating message actually containing the media content to be delivered to terminal B. Therefore, a SIP MESSAGE containing the media content is sent towards terminal B, in a first step 800 (as similar to step 500 in FIG. 5), which is conveyed over session manager A to session manager B.

Even though terminal B is again incompatible, session manager B now responds by sending an acknowledging message in a step 802, such as "SIP 200 OK", which is conveyed over session manager A to entity A. This message will verify that the media content will be delivered, although a new message, not shown, may alternatively be sent to entity A specifically indicating that the content could not be transferred by immediate delivery over IP as intended but will be transferred later by deferred delivery instead.

The remaining steps basically correspond to steps 508-514 in the embodiment of FIG. 5, although executed at the terminating side in the present embodiment. Thus, session manger B now sends a conversion request for the received media content to the format converter 608, in a step 804. The format converter then converts the received media content for deferred delivery, in a conversion step 806. In a next step 808, the format converter sends the converted media content, here in an MMS format, to the messaging center 610 where it is stored temporarily. The converted media content can then finally be delivered to terminal B in a step 810.

Figure 9:
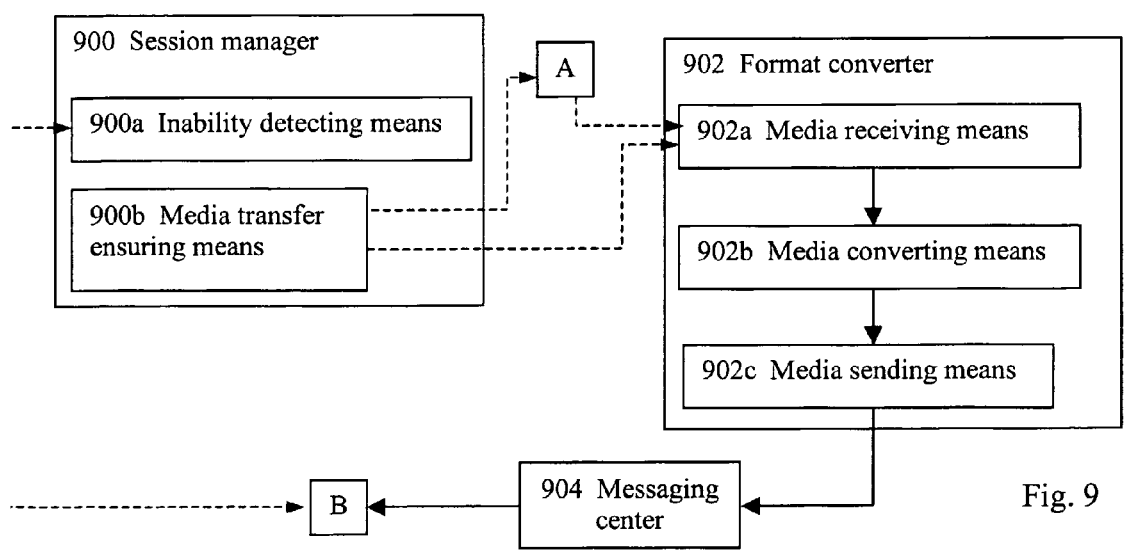
FIG. 9 is a block diagram illustrating an arrangement including a session manager and a media format converter, respectively, according to further embodiments.

Finally, an inventive arrangement will now be described with reference to FIG. 9, schematically illustrating a session manager 900 and a format converter 902, respectively. Session manager 900 includes inability detecting means 900a for detecting whether a receiving terminal B is unable to receive media content by immediate delivery over IP, as indicated by a dashed arrow between blocks 900a and B. Session manager 900 further includes media transfer ensuring means 900b for ensuring that the media content is transferred to media receiving means 902a in the format converter 902.

If a session initiation message from a terminal A indicates that the transfer of media is to follow from A, the media transfer ensuring means 900b will direct terminal A to transfer the media content to the media receiving means 902a, as indicated by a dashed arrow from block 900b to A and a dashed arrow from A to block 902a. Alternatively, if the media is first received from terminal A embedded in a session initiation message, it can be transferred from the session manager 900, as indicated by a dashed arrow from block 900b to block 902a.

Format converter 902 further includes media converting means 902b for converting the media into a format adapted for deferred delivery, and media sending means 902c for sending the converted media content to an intermediate messaging center 904, for deferred delivery to the receiving terminal B.

The above-described embodiments of the present invention thus provides a solution for communicating selected multimedia content from a sending entity to an incompatible receiving terminal, e.g. by not being registered with an IP multimedia service network or by being generally unable to receive the selected multimedia content by immediate delivery over IP for whatever reason. In this solution, the selected multimedia content can be transferred to the incompatible terminal without requiring any functionalities or modifications in the sending entity to that end. It can therefore be used for numerous existing communication terminals.

While the invention has been described with reference to specific exemplary embodiments, the description is in general only intended to illustrate the inventive concept and should not be taken as limiting the scope of the invention. For example, the present invention is not limited to using the currently established MMS mechanism as a fall-back solution when immediate delivery over IP fails, but any other equivalent mechanism for conveying multimedia content by deferred delivery over an intermediate messaging service node may be used. The described "sending entity" could be a mobile or fixed telephone or a content server. The present invention is generally defined by the appended claims.

The invention claimed is:

1. A method of conveying selected media content from a sending entity to a receiving terminal when the sending entity sends the media content for immediate delivery over IP, as executed in an originating multimedia service network serving the sending entity, or in a terminating multimedia service network serving the receiving terminal, the method comprising:

detecting that the receiving terminal is incompatible with, and unable to receive, said media content by immediate delivery over IP, converting said media content into a Multimedia Messaging Service (MMS) message for deferred delivery by a format converter, and sending the MMS message to an intermediate messaging center for deferred delivery to the receiving terminal, wherein a session initiating message directed to the receiving terminal is first received from the sending entity, said message being intended to initiate a session for immediate delivery over IP of the selected media content, wherein the session initiating message is to be followed by the transfer of the media content from the sending entity, an acknowledging message being sent to the sending entity in response to the session initiating message, giving an address of the format converter as the receiving address for said media transfer, such that the sending entity transfers the media content to the format converter.

2. The method according to claim 1, wherein the session initiating message contains the actual media content, said session initiating message containing the media content being transferred to the format converter for said format conversion.

3. The method according to claim 1, wherein the method is performed in said originating network, said detecting step being executed when a session manager in the originating network receives an error message from a session manager in the terminating network, in response to said session initiating message.

4. The method according to claim 1, wherein the session manager in the originating network rewrites said error message by changing it into said acknowledging message before sending it to the sending entity.

5. The method according to claim 1, wherein the method is performed in said terminating network, said detecting step being executed when a session manager in the terminating network determines that the receiving terminal is incompatible.

6. The method according to claim 1, wherein the originating and terminating networks are IMS networks using SIP signaling for session management.

7. The method according to claim 1, wherein the session initiating message is "SIP INVITE" to be followed by the transfer of the media content.

8. The method according to claim 2, wherein the session initiating message is "SIP MESSAGE" containing the actual media content.

9. An arrangement for conveying selected media content from a sending entity to a receiving terminal when the sending entity sends the media content for immediate delivery over IP, the arrangement comprising a processor, and an associated memory storing instructions that, when executed by the processor, cause:

a session manager to detect that the receiving terminal is incompatible with, and unable to receive, said media content by immediate delivery over IP, and a format converter to convert said media content into a Multimedia Messaging Service (MMS) message, and to send the MMS message to an intermediate messaging center for deferred delivery to the receiving terminal, wherein said session manager and format converter are implemented in an originating multimedia service network serving the sending entity, or in a terminating multimedia service network serving the receiving terminal, the session manager to receive a session initiating message from the sending entity, directed to the receiving terminal and intended to initiate a session for immediate delivery over IP of the selected media content, wherein the session initiating message is to be followed by the transfer of the media content from the sending entity, the arrangement including instructions causing the session manager to send an acknowledging message to the sending entity in response to the session initiating message, giving an address of the format converter as the receiving address for said media transfer, such that the sending entity transfers the media content to the format converter.

10. The arrangement according to claim 9, wherein the session initiating message contains the actual media content, the arrangement including instructions to cause the session manager to transfer said session initiating message containing the media content to the format converter for the format conversion.

11. The arrangement according to claim 9, wherein said session manager and format converter are implemented in said originating network, the arrangement including instructions to cause the session manager to detect said inability of the receiving terminal by receiving an error message from a session manager in the terminating network, in response to said session initiating message.

12. The arrangement according to claim 9, the arrangement including instructions to cause the session manager in the originating network to rewrite said error message by changing it into said acknowledging message before sending it to the sending entity.

13. The arrangement according to claim 9, wherein said session manager and format converter are implemented in said terminating network, the arrangement including instructions to cause the session manager to detect said inability of the receiving terminal by determining that the receiving terminal is incompatible.

14. The arrangement according to claim 9, wherein the originating and terminating networks are IMS networks using SIP signaling for session management.

15. The arrangement according to claim 9, wherein the session initiating message is "SIP INVITE" to be followed by the transfer of the media content.

16. The arrangement according to claim 10, wherein the session initiating message is "SIP MESSAGE" containing the actual media content.

17. A session manager, in an arrangement for conveying selected media content from a sending entity to a receiving terminal when the sending entity sends the media content for immediate delivery over IP, the session manager comprising a processor, and an associated memory, storing instructions that, when executed by the processor, cause the session manager to:
    detect that the receiving terminal is incompatible with, and unable to receive, said media content by immediate delivery over IP, and
    ensure that said media content is transferred to a format converter for conversion into a format adapted for deferred delivery, such that the converted media content can be sent to an intermediate messaging center for deferred delivery to the receiving terminal,
    the processor executing instructions that cause the session manager to receive a session initiating message from the sending entity, directed to the receiving terminal and intended to initiate a session for immediate delivery over IP of the selected media content,
    wherein the session initiating message is to be followed by the transfer of the media content from the sending entity, the processor executing instructions that cause the session manager to send an acknowledging message to the sending entity in response to the session initiating message, giving an address of the format converter as the receiving address for said media transfer, such that the sending entity transfers the media content to the format converter.

18. The session manager according to claim 17, wherein the session initiating message contains the actual media content, the processor executing instructions that cause the session manager to transfer said session initiating message containing the media content to the format converter for the format conversion.

19. The session manager according to claim 17, wherein the session manager is implemented in said originating network, the processor executing instructions that cause the session manager to detect said inability of the receiving terminal by receiving an error message from a session manager in the terminating network, in response to said session initiating message.

20. The session manager according to claim 17, the processor executing instructions that cause the session manager to rewrite said error message by changing it into said acknowledging message before sending it to the sending entity.

21. The session manager according to claim 17, wherein the session manager is implemented in said terminating network, the processor executing instructions that cause the session manager to detect said inability of the receiving terminal by determining that the receiving terminal is incompatible.

22. The session manager according to claim 17, wherein the originating and terminating networks are IMS networks using SIP signaling for session management.

23. The session manager according to claim 17 wherein the session initiating message is "SIP INVITE" to be followed by the transfer of the media content.

24. The session manager according to claim 18, wherein the session initiating message is "SIP MESSAGE" containing the actual media content.

25. A format converter in an arrangement for conveying selected media content from a sending entity to a receiving terminal when the sending entity sends the media content for immediate delivery over IP, the format converter comprising a processor and an associated memory storing instructions that, when executed by the processor, cause the format converter to:
    receive said media content when it is detected that the receiving terminal is incompatible with, and unable to receive, said media content by immediate delivery over IP,
    convert the media content into a Multimedia Messaging Service (MMS) message for deferred delivery, and
    send the MMS message to an intermediate messaging center for deferred delivery to the receiving terminal,
    wherein a session initiating message directed to the receiving terminal is first received from the sending entity, said message being intended to initiate a session for immediate delivery over IP of the selected media content,
    wherein the session initiating message is to be followed by the transfer of the media content from the sending entity, an acknowledging message being sent to the sending entity in response to the session initiating message, giving an address of the format converter as the receiving address for said media transfer, such that the sending entity transfers the media content to the format converter.

26. The format converter according to claim 25, the processor executing instructions to cause the format converter to send the media content as an MMS message to the messaging center.

* * * * *